United States Patent [19]

Kojima

[11] Patent Number: 4,635,507
[45] Date of Patent: Jan. 13, 1987

[54] ANGULAR INDEXING DEVICE AND METHOD FOR OUTPUT SHAFT

[75] Inventor: Shigetake Kojima, Nagoya, Japan

[73] Assignee: CKD Kabushiki Kaisha, Aichi, Japan

[21] Appl. No.: 715,879

[22] Filed: Mar. 25, 1985

[30] Foreign Application Priority Data

Mar. 28, 1984 [JP] Japan .............................. 59-44326[U]

[51] Int. Cl.⁴ ........................ B23B 29/24; F16H 1/16
[52] U.S. Cl. .................................... 74/813 C; 74/426
[58] Field of Search ................. 74/813 C, 426, 813 R, 74/815, 827

[56] References Cited

U.S. PATENT DOCUMENTS

| | | | |
|---|---|---|---|
| 3,686,979 | 8/1972 | Petri et al. | 74/813 C |
| 3,817,116 | 6/1974 | Georgieff | 74/426 |
| 3,850,051 | 11/1974 | Woltjen et al. | 74/813 C |
| 4,189,963 | 2/1980 | Sano et al. | 74/813 C |
| 4,366,421 | 12/1982 | Eto et al. | 74/813 C |

FOREIGN PATENT DOCUMENTS

| | | | |
|---|---|---|---|
| 56-119349 | 9/1981 | Japan | 74/813 C |
| 2024058 | 1/1980 | United Kingdom | 74/813 C |

Primary Examiner—Lawrence Staab
Attorney, Agent, or Firm—Robert E. Burns; Emmanuel J. Lobato; Bruce L. Adams

[57] ABSTRACT

A ridge spirally wound around an outer peripheral cam is held between each pair of followers of a rotatable body including a plurality of such followers planted therearound at equal intervals. The ridge of the outer peripheral cam consists of a gentle slope portion having a minute but substantial lead angle other than zero degree and steep slope portions having large lead angles and being continuous from the gentle slope portion at opposite ends thereof. The steep slope portions at opposite ends of the ridge are juxtaposed to each other in parallel relationship. The rotatable body is rotated at a high speed when the followers are engaged with the steep slope portions but rotated at a slow speed when the followers are engaged with the gentle slope portion of the ridge, as the outer peripheral cam is rotated. The output shaft is connected to the rotatable body. The outer peripheral cam is driven by a control motor adapted to be stopped at a desired angular position. The output shaft has respective desired indexed positions preselected within respective ranges in which the output shaft is rotated at a slow speed. Rotational angles of the outer peripheral cam are measured with respect to the respective desired indexed positions and stored in a memory of a control device. The control motor is stopped on the basis of the respective stored values so that the output shaft is repeatedly stopped at the respective desired indexed positions.

5 Claims, 4 Drawing Figures

ANGULAR INDEXING DEVICE AND METHOD FOR OUTPUT SHAFT

BACKGROUND OF THE INVENTION

The present invention relates to an angular indexing device permitting the output shaft to be intermittently rotated with exact index angles and to an angular indexing method utilizing such device.

According to the prior art, as described, for example, in U.S. Pat. No. 3,817,116, an outer peripheral cam including a ridge spirally wound therearound and consisting of a linear portion having a lead angle of 0 and slope portions having relatively large lead angles, respectively, being continuous from said linear portion at opposite ends thereof so that said slope portions at opposite ends are juxtaposed to each other in parallel relationship, is connected to a rotatable shaft of a motor, and each pair of adjacent followers of a rotatable body connected to the output shaft, said rotatable body having a plurality of such followers planted therearound at equal intervals so as to project radially, hold together the ridge of the outer peripheral cam therebetween. The output shaft is maintained stopped together with the rotatable body so long as the followers are in engagement with the ridge of the outer peripheral cam along said linear portion while said outer peripheral cam is rotationally driven at a constant speed by the motor. Upon engagement of the followers with the ridge along its slope portions, the output shaft is rotated together with the rotatable body by a predetermined angle until the next pair of adjacent followers hold the ridge therebetween in engagement with its linear portion, when the output shaft is stopped again. In such angular indexing device for an output shaft of prior art, an accuracy with which the output shaft can be indexed depends upon the precision with which the followers are mounted or planted on the rotatable body. However, working precision of holes formed in the rotatable body into which the respective followers are planted is subject to a certain limitation and it has been impossible, therefore, to improve the output shaft indexing accuracy without improvement of said working precision.

OBJECT OF THE INVENTION

The present invention is based on the situation as mentioned above and a principal object thereof is to provide an angular indexing device for an output shaft so improved that more or less error in mounting the followers on or in the rotatable body can be effectively compensated and thereby the output shaft can be intermittently rotated with an extremely high indexing accuracy and to provide an angular indexing method for output shaft achieved by utilizing this device.

SUMMARY OF THE INVENTION

The angular indexing device for an output shaft constructed in accordance with the present invention comprises an outer peripheral cam including a ridge consisting of a gentle slope portion having a minute lead angle and steep slope portions having relatively large lead angles, respectively, and being continuous from said gentle slope portion at opposite ends thereof, said ridge being spirally wound around said outer peripheral cam so that said steep slope portions are juxtaposed to each other in parallel relationship, each pair of followers of a rotatable body including a plurality of these followers planted therearound at equal intervals being adapted to hold together said ridge of said outer peripheral cam therebetween, an output shaft connected to said rotatable body being rotated at a high speed so long as said followers are engaged with said ridge along said steep slope portions but rotated at a slow speed so long as said followers are engaged with said ridge along said gentle slope portion as said outer peripheral cam rotates, and a control motor adapted to be stopped at a desired angular position and to drive said outer peripheral cam. During engagement of the followers with the ridge of the outer peripheral cam along its gentle slope portion, the followers may be slightly displaced by rotating said outer peripheral cam to rotate the rotatable body only by a minute angle and thereby to achieve an exact angular indexing of the output shaft. This means that more or less error, if any, in mounting of the followers with respect to the rotatable body can be effectively compensated by compensatory rotation of the control motor by an angle corresponding to said error and thereby to achieve an exact indexing rotation of the output shaft. The angular indexing method for an output shaft according to the present invention comprises steps of measuring rotational angles of said outer peripheral cam of the above-mentioned device according to the present invention with respect to respective desired indexed positions which have previously been selected within respective ranges in which said output shaft is rotated at a slow speed, storing values thus measured into said control device and stopping said control motor on the basis of the respective values thus stored so that said output shaft may be repeatedly stopped at said desired indexed positions. This method is advantageous in that the exact angular indexing at a plurality of stop positions can be repeated.

DESCRIPTION OF THE PREFERRED EMBODIMENT

Now an embodiment of the device according to the present invention will be described in reference with the accompanying drawing and a method according to the present invention will be described by way of example in connection with description of a manner in which the device operates.

Figure 1:
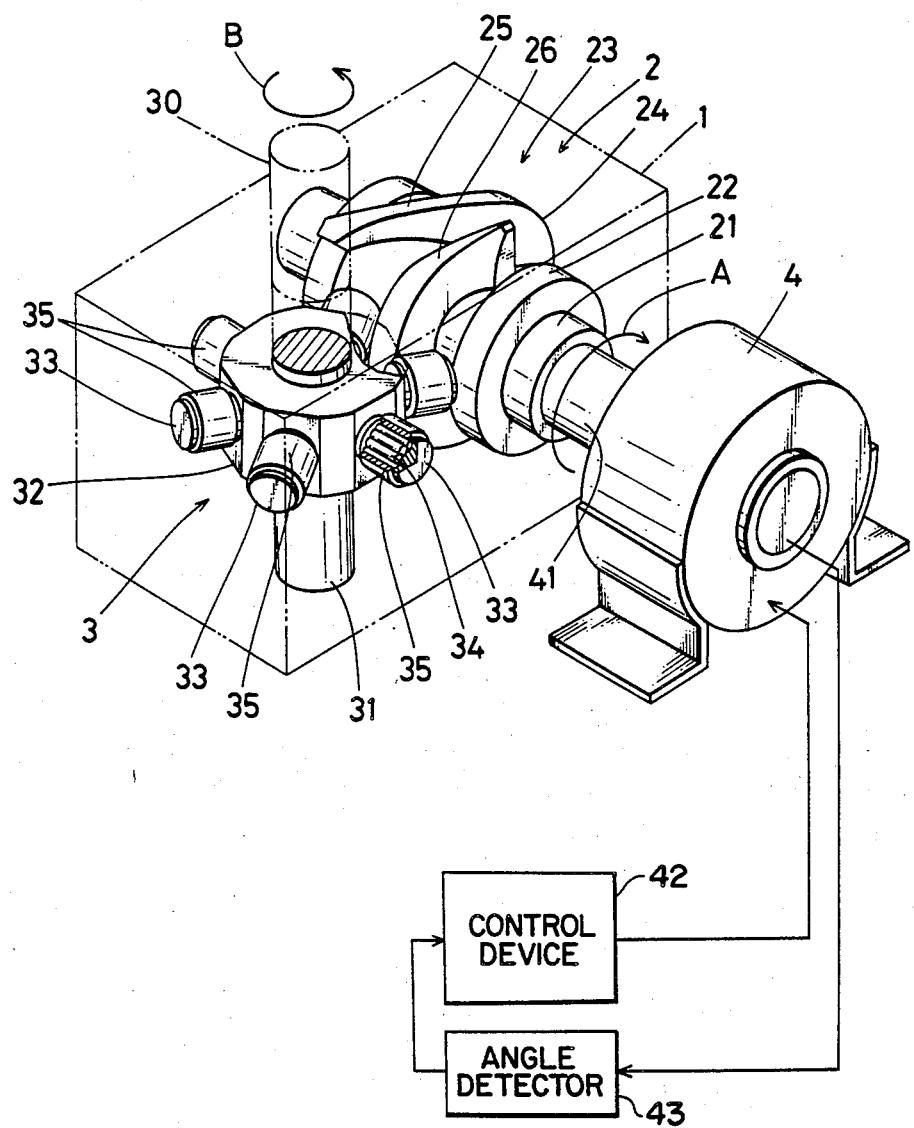
FIG. 1 is a perspective view showing an embodiment of the present invention.

Referring to FIG. 1, a quadrate housing 1 contains therein an outer peripheral cam 2 fixedly mounted on a horizontal shaft 21 and a rotatable body 3 similarly fixed on a vertical shaft 31 at a level corresponding to said horizontal shaft 21, said shafts 21, 31 being rotatably supported in associated bearings (not shown), respectively. The outer peripheral cam 2 comprises a cylindrical main body 22 fitted around the horizontal shaft 21 and having a ridge 23 of trapezoidal cross-section spirally wound thereon. The ridge 23 comprises, in turn, a gentle slope portion 24 slightly inclined with respect to a center line X perpendicular to a rotational center axis and respective steep slope portions 25, 26 significantly inclined along a common direction and being continuous from said gentle slope portion 24 at opposite ends thereof so that these two slope portions 25, 26 are juxtaposed to each other in a parallel relationship, as best seen from the developed view of FIG. 2. The rotatable body 3 comprises the cylindrical main body 32 fitted around the vertical shaft 31 and six pins 33 planted on the outer periphery at equal intervals of 60° so as to extend radially. Each of said pins 33 rotatably carries a roller 35 as a follower by means of needle bearings 34 contained therein so that each pair of the adjacent rollers 35 tightly hold the ridge 23 of the outer peripheral cam 2 therebetween and the respective ones of this pair tightly enter between the steep slope portions 25, 26 defining opposite ends of said ridge. A portion 30 of the vertical shaft 31 projects above the top surface of the housing 1. The horizontal shaft 21 defining the rotational center of the outer peripheral cam 2 is provided at the end projecting through a side of the housing 1 with a rotatable shaft 41 of a pulse motor 4 connected thereto so that said rotatable shaft 41 is responsive to a pulse signal oscillated from a control device 42 for rotation by a small angle, and, to said rotatable shaft 41, there is connected an angle detector 43 adapted for detection of such rotational angle. A value detected thereby is input and stored into said control device 42.

In the arrangement as mentioned above, the number of the rollers 35 carried by the rotatable body 3 should be selected depending on the number of positions at which the output shaft 30 will be indexed and not limited to six. Furthermore, the number of the ridge 23 included in the outer peripheral cam 2 may be two or more, if desired.

Now it will be considered how the embodiment as shown operates.

Figure 2:
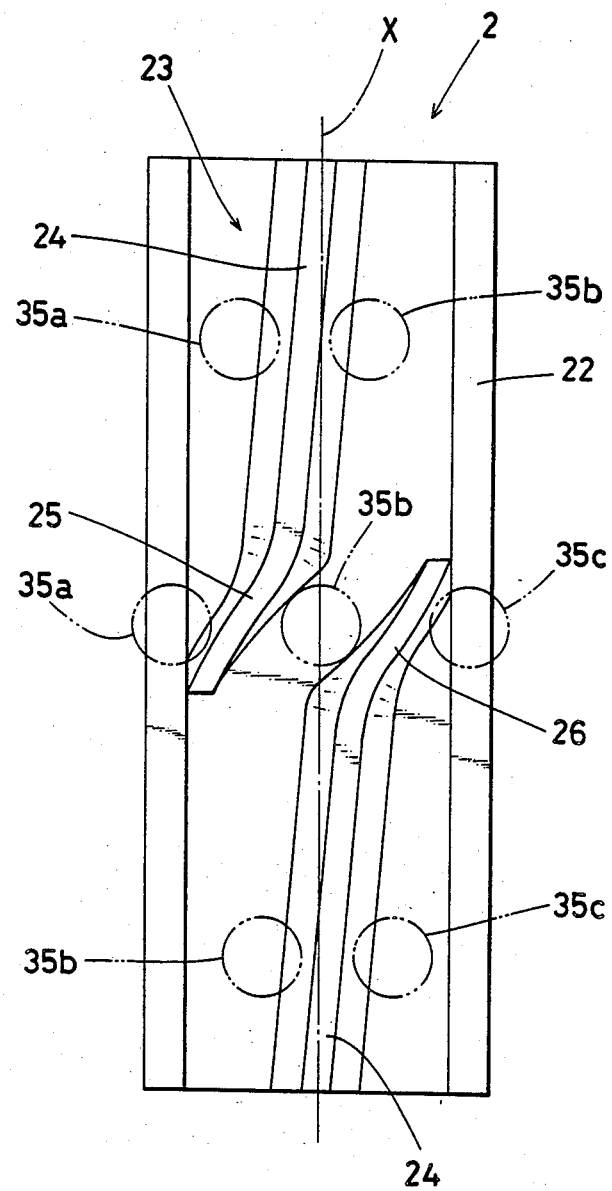
FIG. 2 a developed view of an outer peripheral cam.

Assumed that the rotatable shaft 41 of the pulse motor 4 continuously rotates, it will be apparent from the upper part of FIG. 2 that rotation of the rotatable shaft 41 in a direction as indicated by an arrow A in FIG. 1 causes a pair of the adjacent rollers 35a, 35b to hold the gentle slope portion 24 of the ridge 23 therebetween and for this period said pair of the adjacent rollers 35a, 35b are urged along the inclined walls so that the rotatable body 3 is rotated at a slow speed in a direction as indicated by an arrow B in FIG. 1. It should be noted here that the rollers come into engagement with the gentle slope portion 24 of the ridge 23 over a rotational angle of the outer peripheral cam, e.g., over a range of 270° and the gentle slope portion 24 is provided with a lead angle as small as such that the output shaft 30 rotates by an angle of 1' during said rotation of the outer peripheral cam 2 over the angle of 270°. When the same pair of the adjacent rollers 35a, 35b reach the steep slope portion 25 at the one end of the ridge 23, as seen in the middle part of FIG. 2, said pair of the adjacent rollers 35a, 35b are urged at a high speed along its slope and thereby the rotatable body 3 is rotated at a high speed in the same direction. Simultaneously, the next pair of the adjacent rollers 35b, 35c hold the steep slope portion 26 at the other end of the ridge 23, and then, as seen in the lower part of FIG. 2, the same pair of the adjacent rollers 35b, 35c hold therebetween the gentle slope portion 24 of the ridge 23 as the outer peripheral cam further rotates. Thereby, the rotatable body 3 is rotated at a slow speed in the same direction and a complete rotation of the outer peripheral cam 2 causes said pair of the adjacent rollers 35b, 35c to reach the positions of the precedent pair of the adjacent rollers 35a, 35b and the output shaft 30 rotates together with the rotatable shaft 3 by 60°. A predetermined angle at which the rollers 35 come into engagement with the gentle slope portion 24 of the ridge 3 about longitudinally midway is selected as a reference position and a rotational angle of the output shaft 30 corresponding to an exactly complete rotation of the rotatable shaft 41 of the pulse motor 4 is measured. If the measurement contains an error with respect to the correct rotational angle of 60°, the rotatable shaft 41 of the pulse motor 4 may be forwardly or reversely rotated for compensation until said error is compensated and this compensatory rotational angle may be detected by the angle detector 43 which inputs and stores such detected angle into the control device 42. By successively performing such operation five times, all the compensatory angles to assure that the output shaft 30 correctly rotates 60° by 60° are thus previously stored into the control device 42. In actual operation, the control device 42 supplies the pulse motor 4 with the number of pulses necessary for a complete rotation of the rotatable shaft 41 thereof plus or minus the number of pulses corresponding to the respective compensatory angles at regular time intervals so that the rotatable shaft 41 is intermittently rotated and thereby the output shaft 30 is intermittently rotated exactly 60° by 60°.

Figure 3:
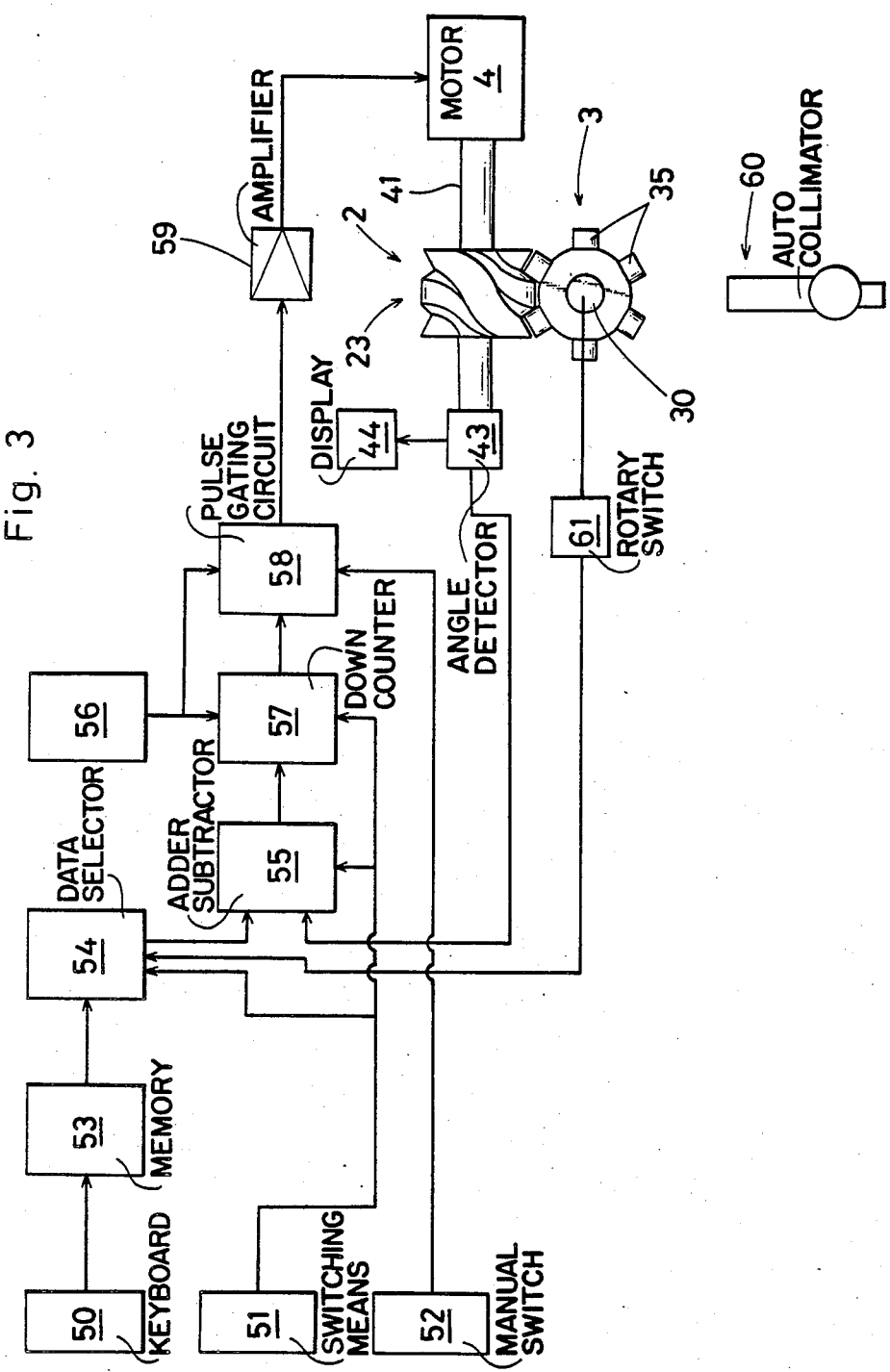
FIG. 3 is a block diagram illustrating an electric circuit arrangement.
Figure 4:
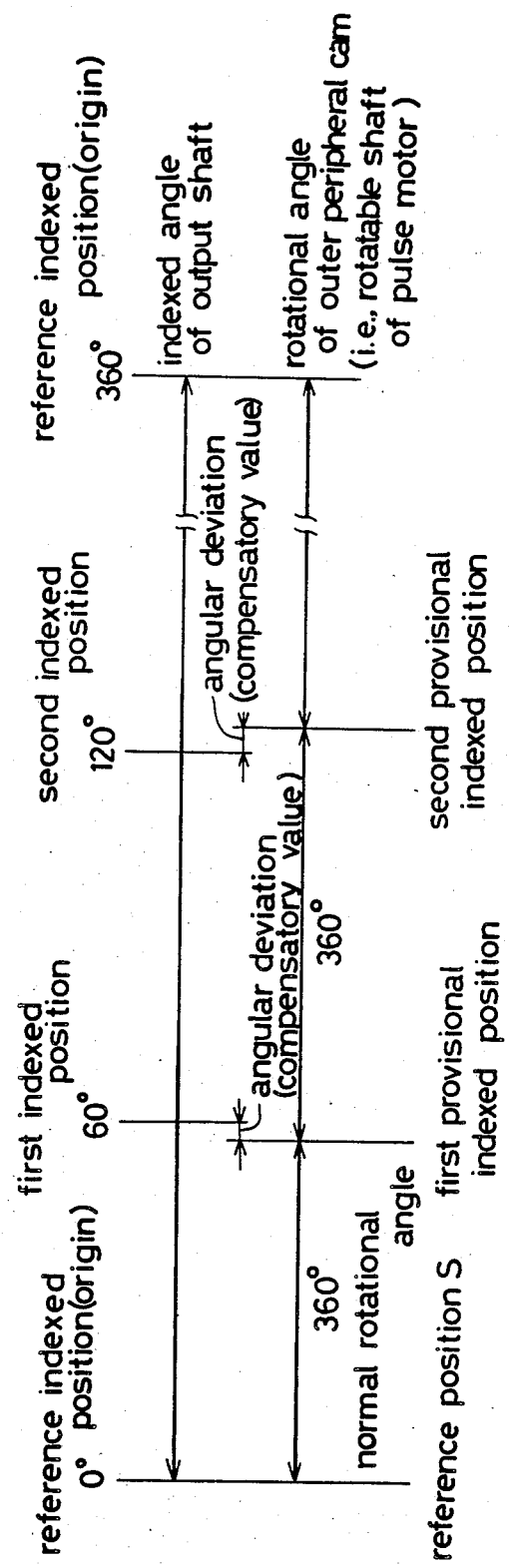
FIG. 4 illustrates by way of example a method for indexing an output shaft.

The manner of operation as above-mentioned in reference with the embodiment shown will be now described more in detail with reference to FIGS. 3 and 4.

The angle detector 43 is operatively connected to an end of the rotatable shaft 41 of the pulse motor 4 extending through the outer peripheral cam 2 and adapted to detect an absolute angular value of the rotatable shaft 41 with a precision of, for example, 1°/10. Said angle detector 43 is so preset that its detection value is 0 corresponding to a reference position S as shown in FIG. 4 in a phase at which the followers 35 of the rotatable body 3 come into engagement with the gentle slope portion 24 of the ridge 23 of the outer peripheral cam 2 substantially midway of said gentle slope portion 24. An equilaterally hexagonal reflector axially mounted in the output shaft 30 of the rotatable body 3 is so preset that, in said phase, an autocollimator 60 has a reading of 0 with respect to one of reflecting surfaces of said reflector, and the angle of the output shaft 30 in this phase is selected as a reference indexed position. Then, a compensatory value may be determined for a first indexed position to which the output shaft 30 has rotated by 60° from the reference indexed position by measuring a deviation of a rotational angle of the outer peripheral cam 2 from the normal rotational angle of 360° corresponding to the rotational angle of the outer peripheral cam 2 on the assumption that a mounting tolerance of the followers 35 is 0. To this end, an oscillation frequency of a pulse oscillator 56 is provisionarily set to a relatively low value and a manual switch 52 for drive command is activated so that a command pulse gating circuit 58 may be kept open during activation of said switch 52 and low frequency pulse signals oscillated from the pulse oscillator 56 may be amplified by an amplifier 59 to be supplied as drive pulses to the pulse motor 4 of which the rotatable shaft 41 is rotated thereby at a low velocity. This rotational angle is visually determined on a display 44 of the angle detector 43 and, when the display 44 indicates a value of 360°, the manual drive command switch 52 may be restored off to close again the command pulse gating circuit 58 so that the pulse signals cease to be supplied and thereby the pulse motor 4 is stopped together with the outer peripheral cam 2 as well as the rotatable body 3 both driven by said pulse motor 4. This position should be a first provisional indexed position. However, the followers 35 usually have a mounting tolerance with respect to the rotatable body 3 and, therefore, said provisional indexed position is not coincident with the first indexed position exactly at an angle of 60° relative to said reference indexed position. To compensate such deviation, the manual drive command switch 52 may be activated again to open the command pulse gating circuit 58 and thereby the low frequency pulse signals oscillated from the pulse oscillator 56 may be amplified by the amplifier 59 so that the amplified drive pulses drive the pulse motor 4 and thereby rotate the outer peripheral cam 2. A rotational angle of the output shaft 30 is measured by the autocollimator 60 and, when the output shaft 30 has reached the first indexed position to which said output shaft 30 has rotated exactly by 60° from said reference indexed position, the manual drive command switch 52 is restored off to stop the pulse motor 4, the outer peripheral cam 2 and the rotatable body 3. An angle of the rotatable shaft 41 in this state is read in the display 44 of the angle detector 43 and a digital value corresponding to an angular deviation from the first provisional indexed position in input by a key board switch 50 into a memory 53 for storage therein as a compensatory value. Such operation as above mentioned may be repeated to determine a compensatory value of the rotatable shaft 41 relative to a second indexed position at an angle of 120° from the reference indexed position and then to determine such compensatory values relative to third, fourth and fifth indexed positions successively at the angle of 60° with respect to the precedent indexed positions, respectively. These compensatory values are sucessively stored into the memory 53.

Now an automatic indexing operation is achieved as follows: After the autocollimator 60 is removed and the oscillation frequency of the pulse oscillator 56 is set to a relatively high value, index command switching means 51 is activated so that, after a time preset in said switching means 51 has elapsed, an adder/subtractor circuit 55 and a down-counter 57 are successively activated. A rotary switch 61 mounted on the output shaft 30 successively detects the reference indexed position through the fifth indexed position and the compensatory values for respective index angles corresponding to these indexed positions are selectively called by a data selector 54 from the memory 53. The compensatory value thus called is input to the adder/subtractor 55 in which said compensatory value is added/subtracted with respect to 360°, the normal rotational angle of the rotatable shaft 41 and the result is input to the down-counter 57. The input value of said down-counter 57 is subjected to subtraction with the high frequency pulse signals supplied from the pulse oscillator 56 while signals with which the command pulse gating circuit 58 is opened are output until the result of subtraction becomes 0. Thus, the high frequency pulse signals oscillated from the pulse oscillator 56 are input to the amplifier 59 and the amplified drive pulses are supplied to the pulse motor 4 which is thereby rotated at a high velocity. When the result of subtraction in the down-counter 57 reaches 0, the command pulse gating circuit 58 is closed again and generation of the pulse signals is thereby stopped. Simultaneously, the pulse motor 4 is also stopped together with the outer peripheral cam 2 and the rotatable body 3 both driven by said pulse motor while the output shaft 30 has rotated exactly by 60°. After the time preset in the index command switching means 51, the data selector 54 is activated again, then the adder/subtractor circuit 55 and the down-counter 57 also are successively activated. Thus, the compensatory value corresponding to the next indexed position detected by the rotary switch 61 is called by the data selector circuit 54 from the memory 53 and the output shaft 30 rotates exactly by 60° to the next indexed position in the same manner as previously mentioned. By repeating a series of such operation, the output shaft 30 is intermittently rotated exactly 60°.

In this embodiment, an absolute angular value of the rotatable shaft 41 is fedback from the angle detector 43 to the adder/subtractor circuit 55 so that the actual angle of the rotatable shaft 41 is compared with the result of addition/subtraction (command value). If an error is determined between these two values, a value of this error is input to the down-counter 57 and the pulse motor 4 is compensatively rotated in accordance with this input until the actual angle of the rotatable shaft 41 comes in coincidence with the command value. If there is no danger of such error, however, it will be unnecessary to feedback the actual angle of the rotatable shaft 41 to the adder/subtraction circuit 55.

It should be understood here that, an angular deviation relative to the normal rotational angle of the outer peripheral cam 2 is stored as the compensatory value in the embodiment as described above, an absolute rotational angle of the outer peripheral cam 2 relative to each exact indexed position may be stored.

Finally, the driving motor for the outer peripheral cam 2 is not limited to the pulse motor as employed in the embodiment as shown, by may be other types of control motor such as servomotor, brake motor and speed variable motor.

I claim:

1. An angular indexing device for indexing an output shaft successively to a plurality of indexed positions comprising:

a first rotatable body having thereon an outer peripheral cam comprising a ridge wound spirally thereon and having a gentle slope portion having a minute but substantial lead angle other than 0° and steep slope portions having relatively large lead angles and being continuous with said gentle slope portion at opposite ends thereof, said steep slope portions being juxtaposed to each other in parallel relationship, a second rotatable body connected to said output shaft and having therearound at approximately equal angular intervals a plurality of radially projecting followers positioned for engagement of said cam ridge of said first rotatable member between successive followers, means for intermittently rotating said first rotatable member through an angle of approximately 360° and thereby rotating said second rotatable body between successive indexed positions, said second rotatable body being rotated at a high speed when said followers are engaged with said steep slope portions of said cam ridge of said first rotatable member and being rotated at a low speed when said followers are engaged with said gentle slope portion, said first rotatable member stopping when said followers are engaged with said gentle slope portion, said means for rotating said first rotatable member comprising a pulse motor and circuit means controlling said pulse motor, said circuit means comprising oscillator means for supplying pulses to said motor to drive said motor, memory means for recording compensatory values of the number of pulses for respective indexing angles between respective indexed positions of said second rotatable body, rotary switch means for detecting the reference indexed position of said second rotatable member, data selector means controlled by said rotary switch means for selecting the compensatory value of the number of pulses for shifting said second rotatable member through the respective indexing angle between respective indexed positions and pulse counting means for counting pulses supplied to said motor and stopping said motor when the compensatory value of the number of pulses for the respective indexing angle has been counted.

2. An angular indexing device according to claim 1, further comprising means for visually detecting the precise angle of said second rotatable member, means for operating said oscillator means at a slow rate, manually operable means for stopping said motor when said second rotatable member is in a precise indexed position, and means for determining a compensatory value of the number of pulses for each indexed position and feeding said values into said memory means.

3. An angular indexing device according to claim 1, further comprising an angle detector for detecting the absolute angle of rotation of said first rotatable member, means for comparing said absolute angle with the result of said counting means and means for inputting a corrective value into said counting means in the event of any error.

4. A method of angularly indexing an output shaft successively to a plurality of indexed positions with an angular indexing device comprising;

a first rotatable body having thereon an outer peripheral cam comprising a ridge would spirally thereon and having a gentle slope portion having a minute but substantial lead angle other than 0° and steep slope portions having relatively large lead angles and being continuous with said gentle slope portion at opposite ends thereof, said steep slope portions being juxtaposed to each other in parallel relationship, a second rotatable body connected to said output shaft and having therearound at approximately equal angular intervals a plurality of radially projecting followers positioned for engagement of said cam ridge of said first rotatable member between successive followers, means for intermittently rotating said first rotatable member through an angle of approximately 360° and thereby rotating said second rotatable member between successive indexed positions, said second rotatable member being rotated at a high speed when said followers are engaged with said steep slope portions of said cam ridge of said first rotatable member and being rotated at a low speed when said followers are engaged with said gentle slope portion, said first rotatable member stopping when said followers are engaged with said gentle slope portion, said means for rotating said first rotatable member comprising a motor and circuit means controlling said motor, said control circuit means including memory means for individually controlling the angle through which said first rotatable member is rotated for each indexing angle of said second rotatable member between respective indexed positions, said method comprising the steps of:

operating said motor at low speed, measuring values of the respective rotational angle of said first rotatable member for each indexing movement of said second rotatable member between respective indexed positions, storing values thus measured in said memory means of said control circuit means, and controlling said motor in accordance with said stored values to rotate said first rotatable member through a predetermined angle for each of the respective indexing movements of said second rotatable member so that said output shaft is repeatedly stopped at predetermined indexed positions.

5. A method of angularly indexing an output shaft according to claim 4, further comprising detecting the absolute angle of rotation of said first rotatable member for each indexing movement of said second rotatable member between successive indexed positions, comparing the values of said absolute angles with values stored in said memory means and correcting said stored values if error appears.

* * * * *